(12) United States Patent
Tang et al.

(10) Patent No.: US 10,809,568 B2
(45) Date of Patent: Oct. 20, 2020

(54) LIGHT CONVERGENCE STRUCTURE AND BACKLIGHT MODULE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Hai Tang, Beijing (CN); Jingbin Jie, Beijing (CN); Lu Gao, Beijing (CN); Jianwei Qin, Beijing (CN); Liang Gao, Beijing (CN); Bo Han, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/440,127

(22) Filed: Jun. 13, 2019

(65) Prior Publication Data

US 2020/0019020 A1 Jan. 16, 2020

(30) Foreign Application Priority Data

Jul. 16, 2018 (CN) .......................... 2018 1 0778012

(51) Int. Cl.
*G02F 1/1335* (2006.01)
*G02F 1/13357* (2006.01)
*F21V 8/00* (2006.01)

(52) U.S. Cl.
CPC ..... *G02F 1/133606* (2013.01); *G02B 6/0063* (2013.01); *G02F 1/133615* (2013.01); *G02F 2001/133607* (2013.01)

(58) Field of Classification Search
CPC ............. G02F 1/1335; G02F 1/133606; G02F 1/133603; G02F 1/133526;
(Continued)

(56) References Cited

U.S. PATENT DOCUMENTS 5,285,318 A 2/1994 Gleckman
5,396,350 A * 3/1995 Beeson ................ G02B 6/0053
349/62

(Continued)

FOREIGN PATENT DOCUMENTS

CN 1135797 A 11/1996
CN 1136349 A 11/1996
TW 222021 B 4/1994

OTHER PUBLICATIONS

First Office Action for Chinese Application No. 201810778012.5, dated Sep. 2, 2020, 7 pages.

*Primary Examiner* — Thoi V Duong
(74) *Attorney, Agent, or Firm* — Brooks Kushman P.C.

(57) ABSTRACT

A light convergence structure includes light convergence portions. Each light convergence portion includes a frustum structure and a plano-convex structure. The frustum structure includes a first end surface and an opposite second end surface. An area of the first end surface is less than an area of the second end surface. The plano-convex structure is on the second end surface of the frustum structure. The plano-convex structure includes a flat surface and an opposite convex spherical surface. The flat surface is in contact with the second end surface. An area of the flat surface is equal to the area of the second end surface. The first end surfaces of the light convergence portions are coplanar and together define a light incident surface of the light convergence structure.

19 Claims, 5 Drawing Sheets

(58) Field of Classification Search
CPC .............. G02F 1/133615; G02F 1/1336; G02F 1/133504; G02F 1/133611; G02F 2001/133607; G02B 5/045; G02B 6/00; G02B 6/0053; G02B 6/0018; G02B 6/0028; G02B 6/0043; G02B 6/0063; G02B 27/0172

See application file for complete search history.

(56) References Cited

U.S. PATENT DOCUMENTS 5,598,281 A * 1/1997 Zimmerman ..... G02F 1/133606
349/5
5,839,812 A 11/1998 Ge et al.

* cited by examiner

LIGHT CONVERGENCE STRUCTURE AND BACKLIGHT MODULE

CROSS-REFERENCE TO RELATED APPLICATION

This application claims priority to Chinese Patent Application No. 201810778012.5 filed on Jul. 16, 2018, which is incorporated herein by reference in its entirety.

TECHNICAL FIELD

The present disclosure relates to the field of liquid crystal product manufacturing technologies, and in particular to a light convergence structure and a backlight module.

BACKGROUND

Intelligent display has characteristics of anti-peep, high-dynamic range (HDR), low power consumption, module structure optimization, and so on. The intelligent display is one of current technological trends in the development of display industry.

SUMMARY

One embodiment of the present disclosure provides a light convergence structure including a plurality of light convergence portions arranged in an array. Each of the plurality of light convergence portions includes a frustum structure and a plano-convex structure. The frustum structure includes a first end surface and a second end surface, the first end surface and the second end surface are two opposite surfaces of the frustum structure, and an area of the first end surface is less than an area of the second end surface. The plano-convex structure is on the second end surface of the frustum structure, the plano-convex structure includes a flat surface and a convex spherical surface, the flat surface and the convex spherical surface are two opposite surfaces of the plano-convex structure, the flat surface is in contact with the second end surface, and an area of the flat surface is equal to the area of the second end surface. The first end surfaces of the plurality of light convergence portions are coplanar and together define a light incident surface of the light convergence structure.

In one embodiment, the flat surface coincides with the second end face.

In one embodiment, an angle is defined between an outer periphery surface of each frustum structure and the light incident surface, and the angle is greater than such a preset angle so that light entering into the frustum structure is totally reflected on an inner side wall of the frustum structure.

In one embodiment, each frustum structure includes a first sub-frustum structure and a second sub-frustum structure from the first end surface to the second end surface. A first angle is defined between the light incident surface and an outer periphery surface of the first sub-frustum structure adjacent the light incident surface; a second angle is defined between the light incident surface and an outer periphery surface of the second sub-frustum structure distal to the light incident surface; and the first angle is less than the second angle.

In one embodiment, a curvature of the convex spherical surface satisfies a preset condition such that light totally reflected by an inner side wall of the frustum structure is refracted to form a collimated light perpendicular to the light incident surface.

In one embodiment, the light convergence structure further includes a plurality of connectors, the light convergence portions in one row or column are located between two adjacent connectors, and there is a gap between the light incident surface and one end of the connectors adjacent the light incident surface.

In one embodiment, a distance from the incident surface to an end of the connectors distal from the light incident surface, is greater than a distance from the light incident surface to the first end of the light convergence portions.

In one embodiment, an absolute value of a difference between a refractive index of the light convergence portion and a refractive index of the connector is less than or equal to a preset value.

In one embodiment, an absolute value of a difference between a refractive index of the light convergence portion and a refractive index of the connector is zero.

In one embodiment, a first light shading portion is at a lateral side surface of the light convergence structure.

In one embodiment, a thickness of the light convergence structure in a direction perpendicular to the light incident surface is 0.06 mm.

One embodiment of the present disclosure provides a backlight module including: a light guide plate having a light-entering surface and a light emitting surface; and a light convergence structure on the light emitting surface of the light guide plate. The light convergence structure includes a plurality of light convergence portions, and each of the plurality of light convergence portions includes a frustum structure and a plano-convex structure. The frustum structure includes a first end surface and a second end surface, the first end surface and the second end surface are two opposite surfaces of the frustum structure, and an area of the first end surface is less than an area of the second end surface. The plano-convex structure is on the second end surface of the frustum structure, the plano-convex structure includes a flat surface and a convex spherical surface, the flat surface and the convex spherical surface are two opposite surfaces of the plano-convex structure, the flat surface is in contact with the second end surface, and an area of the flat surface is equal to the area of the second end surface. The first end surfaces of the plurality of light convergence portions are coplanar and together define a light incident surface of the light convergence structure, and the light incident surface of the light convergence structure is in contact with the light emitting surface of the light guide plate.

In one embodiment, the backlight module further includes a light source at the light-entering surface of the light guide plate, the light emitting surface of the light guide plate includes a first area and a second area along a propagation direction of light travelling in the light guide plate. A second light shading portion is at the first area. Among light rays emitted from the light source, light rays which are irradiated on the light guide plate at an incident angle less than a first angle, enter the first area; among the light rays emitted from the light source, light rays which are irradiated on the light guide plate at an incident angle greater than the first angle, enter the second area; and the first angle is a total reflection threshold angle.

In one embodiment, a reflective layer is on the light guide plate except for the light emitting surface and the light-entering surface.

In one embodiment, an absolute value of a difference between a refractive index of the light convergence portion and a refractive index of the light guide plate is less than or equal to a preset value, such that when light is propagated in the light guide plate in a total reflection manner, and when the light is propagated to a position corresponding to the first end surface of the light convergence portion, the light is enabled to directly enter into the light convergence portion at the position.

In one embodiment, the preset value is zero.

In one embodiment, the flat surface coincides with the second end face.

In one embodiment, an angle is defined between an outer periphery surface of each frustum structure and the light incident surface, and the angle is greater than such a preset angle so that light entering into the frustum structure is totally reflected on an inner side wall of the frustum structure. Each frustum structure includes a first sub-frustum structure and a second sub-frustum structure from the first end surface to the second end surface. A first angle is defined between the light incident surface and an outer periphery surface of the first sub-frustum structure adjacent the light incident surface. A second angle is defined between the light incident surface and an outer periphery surface of the second sub-frustum structure distal to the light incident surface; and the first angle is less than the second angle.

In one embodiment, a curvature of the convex spherical surface satisfies a preset condition such that light totally reflected by an inner side wall of the frustum structure is refracted to form a collimated light perpendicular to the light incident surface.

In one embodiment, the plurality of light convergence portions are arranged in an array on the light emitting surface of the light guide plate; the light convergence structure further includes a plurality of connectors. The light convergence portions in one row or column are located between two adjacent connectors, and there is a gap between the light incident surface and one end of the connectors adjacent the light incident surface. A distance from the incident surface to an end of the connectors distal from the light incident surface, is greater than a distance from the light incident surface to the first end of the light convergence portions.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

The technical bottleneck of directional optics in the intelligent display technology lies in collimated beams. The existing collimation scheme includes film drilling and increasing absorption grating. Although these schemes can obtain a certain near collimation effect, the brightness is reduced by more than 30%. Meanwhile, a module thickness will also increase. This not only does not meet design requirements of low power consumption, but also does not meet the development trend of the module structure optimization.

Figure 1:
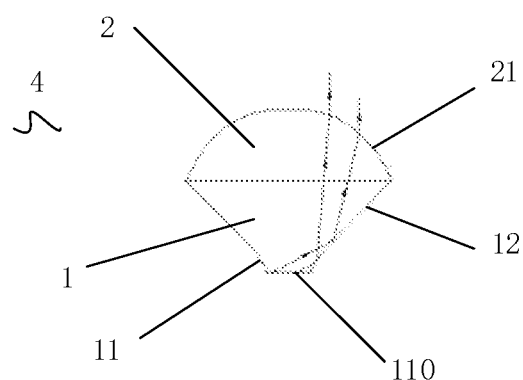
FIG. 1 is a schematic view of a light convergence portion according to an embodiment of the present disclosure.

In view of this, one embodiment of the present disclosure provides a light convergence structure for converging light emitted from a light emitting surface of a light guide plate. The light convergence structure includes a body disposed on the light emitting surface of the light guide plate. The body includes a plurality of light convergence portions. As shown in FIG. 1, each light convergence portion 4 includes a frustum structure 1 and a plano-convex structure 2.

The frustum structure 1 includes a first end surface 110 and a second end surface. The first end surface 110 and the second end surface are two opposite surfaces of the frustum structure 1. The first end surface 110 is in contact with the light guide plate. An area of the first end surface 110 is less than an area of the second end surface. The first end surfaces 110 of the plurality of light convergence portions are coplanar and then together define a light incident surface 200 (as indicated with dotted line in FIG. 9) of the light convergence structure.

The plano-convex structure 2 is disposed on the second end surface of the frustum structure 1. Each plano-convex structure 2 includes a flat surface and a convex spherical surface 21. The flat surface and the convex spherical surface 21 are two opposite surfaces of the plano-convex structure 2. The flat surface is in contact with the second end surface. An area of the flat surface is equal to the area of the second end surface.

Figure 10:
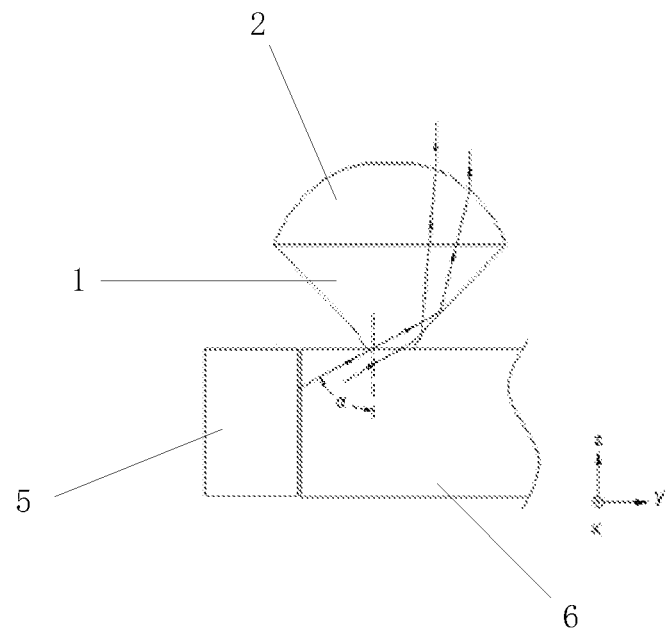
FIG. 10 is a schematic diagram showing light paths of the light convergence structure when being applied to a light guide plate according to an embodiment of the present disclosure.

FIG. 1 is a schematic view of a light convergence portion according to an embodiment of the present disclosure. As shown in FIG. 1, light emitted from a light emitting surface of a light guide plate enters the frustum structure 1, then is reflected by a side surface of the frustum structure 1 to the plano-convex structure 2, and then the convex spherical surface 21 converges the reflected light, thereby achieving the purpose of light convergence. FIG. 10 is a schematic diagram showing light paths of the light convergence structure when it is applied to a light guide plate. As shown in FIG. 10, the presence of the light convergence structure can realize adjustment of directions of light without reducing brightness.

In one embodiment, an absolute value of a difference between a refractive index of the light convergence portion 4 and a refractive index of the guide plate is less than a first preset value. By such a design, when light is propagated in the light guide plate in a total reflection manner and is propagated to a position corresponding to the first end surface 110 of the light convergence portion 4, the light is enabled to directly enter into the light convergence portion 4 at the position corresponding to the first end surface 110 of the light convergence portion 4.

In case that the refractive index of the light convergence portion 4 is different from the refractive index of the guide plate, when light is propagated in the light guide plate in a total reflection manner and is propagated to a position where the light convergence portion 4 is in contact with the light guide plate, some of the light still may be reflected. Thus, the absolute value of the difference between the refractive index of the light convergence portion 4 and the refractive index of the guide plate should be as small as possible. In other words, the first preset value should be as small as possible, thereby reducing loss of light efficiency.

Optionally, the first preset value may be zero, i.e., the refractive index of the light convergence portion 4 is equal to the refractive index of the guide plate. In this way, when light is propagated in the light guide plate in a total reflection manner and is propagated to a position where the light convergence portion 4 is in contact with the light guide plate, the light directly enters into the light convergence portion 4 without being reflected, thereby facilitating control of angles of the light and avoiding light loss.

In order to further ensure the light efficiency effectively, in one embodiment, an angle is defined between an outer periphery surface of each frustum structure 1 and the light emitting surface of the light guide plate. The angle is greater than a preset angle, so that the light entering into the frustum structure 1 is totally reflected on an inner side wall of the frustum structure 1. In one embodiment, the preset angle may be 130°.

The light convergence structure of one embodiment of the present disclosure has better convergence effect on light that travels in a first dimension direction (i.e., a direction along which the light propagates in the light guide plate, for example, the Y direction shown in FIG. 10) and a second dimension direction (i.e., a direction parallel to the light emitting surface of the light guide plate and perpendicular to the first dimension direction, for example, the X direction shown in FIG. 10). The convergent effects may include that an angle of a half-brightness angle of the light travelling in the first dimension direction may be less than or equal to 15°, an angle of a half-brightness angle of the light travelling in the second dimension direction may be less than or equal to 20°, and there is a cut-off angle about 40° in the two dimension directions (generally, the cutoff angle is an angle of light when the brightness of the backlight module is less than 5 nit; by taking a transmittance as 5% for calculation, the cutoff angle is an angle of light when the brightness of the backlight module is less than 100 nit).

Figure 2:
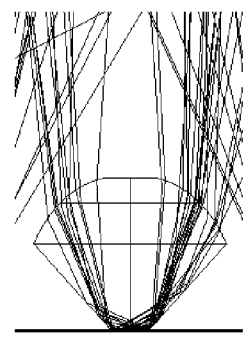
FIG. 2 is a first schematic diagram showing simulated light paths of the light convergence portion according to an embodiment of the present disclosure.
Figure 3:
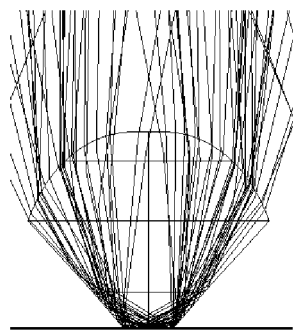
FIG. 3 is a second schematic diagram showing simulated light paths of the light convergence portion according to an embodiment of the present disclosure.
Figure 4:
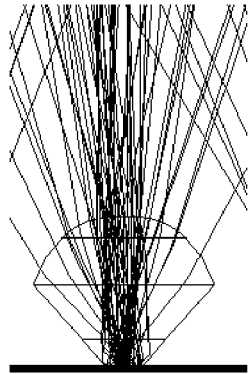
FIG. 4 is a third schematic diagram showing simulated light paths of the light convergence portion according to an embodiment of the present disclosure.

In this embodiment, the frustum structure 1 may be in a variety of forms. The outer periphery surface of each frustum structure 1 may be smooth and may be composed of a cone. The outer periphery surface of each frustum structure 1 may also be curved and is composed of several cones. FIG. 2 is a schematic diagram showing light paths of light in a third dimension direction (which is perpendicular to the first dimension direction and the second dimension direction, i.e., the Z direction shown in FIG. 10) when the outer periphery surface of the frustum structure 1 is composed of a cone. FIG. 3 is a schematic diagram showing light paths of light in the third dimension direction when the outer periphery surface of the frustum structure 1 is composed of two cones. FIG. 4 is a schematic diagram showing light paths of light in the third dimension direction when the outer periphery surface of the frustum structure 1 is composed of two cones. As shown in FIG. 2, emitted light rays are mainly concentrated on two sides of the light convergence portion 4. In order to ensure brightness in the middle, as shown in FIG. 3 and FIG. 4, when the frustum structure 1 is composed of two cones, light beams are diverged and emitted light rays are more uniform.

Optionally, in one embodiment, each frustum structure 1 is divided into at least two sub-frustum structures from the first end surface to the second end surface. A first angle is defined between the light emitting surface of the light guide plate and an outer periphery surface of one sub-frustum structure adjacent the light guide plate. A second angle is defined between the light emitting surface of the light guide plate and an outer periphery surface of one sub-frustum structure distal to the light guide plate. The first angle is less than the second angle.

Figure 5:
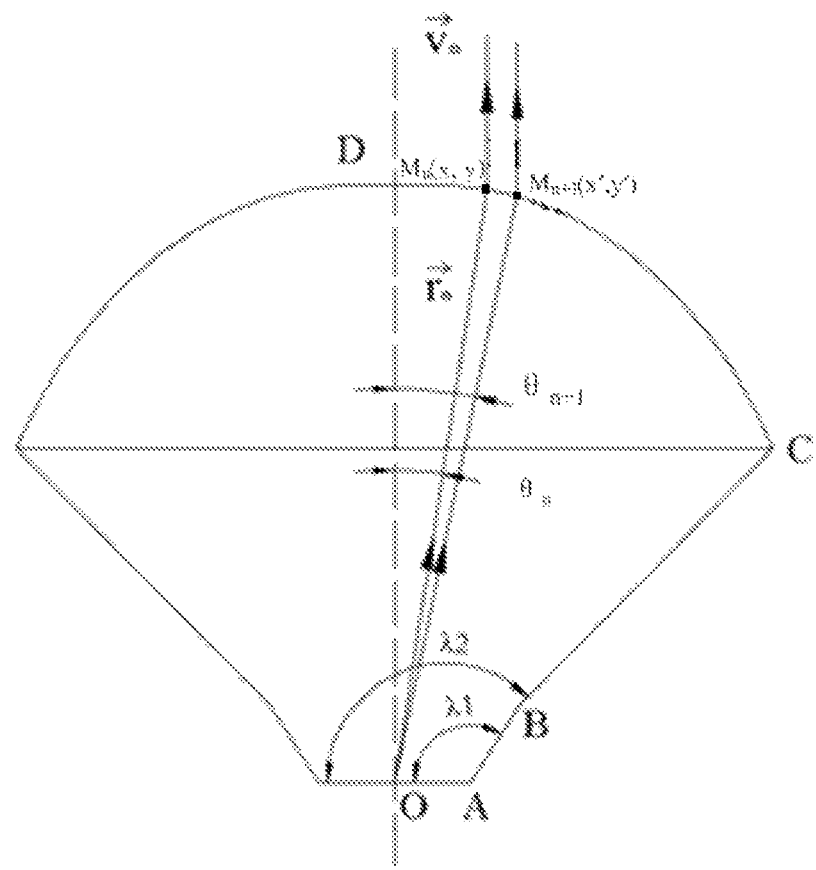
FIG. 5 is a schematic diagram showing light paths of a convex spherical surface of the light convergence portion according to an embodiment of the present disclosure.

As shown in FIG. 1 and FIG. 5, the frustum structure includes two sub-frustum structures. One sub-frustum structure, which is in contact with the light guide plate, is referred as a first sub-frustum structure 11. One sub-frustum structure, which is distal to the light guide plate, is referred as a second sub-frustum structure 12. A first angle $\lambda 1$ is defined between the light emitting surface of the light guide plate and an outer periphery surface of the first sub-frustum structure 11. A second angle $\lambda 2$ is defined between the light emitting surface of the light guide plate and an outer periphery surface of the second sub-frustum structure 12. The first angle $\lambda 1$ is less than the second angle $\lambda 2$.

The first angle $\lambda 1$ and the second angle $\lambda 2$ may be set according to light paths. Light entering the bottom surface of the frustum structure 1 is light that travels in the light guide plate in total reflection mode and is not emitted into the air. When the light is incident on the peripheral surface of any frustum structure, total reflection occurs. An angle between the light and a direction perpendicular to the outer peripheral surface of one sub-frustum structure, is between a total reflection critical angle and 90°.

According to the principle of reflection, the light is scattered and projected onto the convex spherical surface 21. According to distribution of reflected light, an angle value is selected according to simulation software effect, then a target function is set by using a software built-in algorithm and then is optimized to obtain a relatively reasonable angle between the light guide plate and the outer peripheral surface of the corresponding sub-frustum structure. In one embodiment, as shown in FIG. 5, optionally, the first bevel angle λ1 is 130°, and the second bevel angle λ2 is 132°, which are not limited thereto.

In one embodiment, the curvature of the convex spherical surface 21 satisfies a preset condition such that the light totally reflected by the inner side wall of the frustum structure 1 is refracted to form a collimated light perpendicular to the light emitting surface of the light guide plate.

The convex spherical surface 21 is a structure that is rotationally symmetrical about a center point thereof. As shown in FIG. 5, a center point of the convex spherical surface 21, a center point of the flat surface of the plano-convex structure, a center point of the first end surface 110 of the frustum structure 1 and a center point of the second end surface is on the same line. An "imaginary light source point" of light beams in the x-direction (the second dimension direction) and the y-direction (the first dimension direction) is set according to light paths of light rays incident on the light convergence portion 4. Based on the "imaginary light source point", the convex spherical surface 21 is calculated in following ways.

As shown in FIG. 10, it is supposed that the O point is the hypothetical light source point, DC represents a free curve, the refractive index of the light convergence structure is represented by $n_2$, the refractive index $n_1$ of the air is equal to 1, the incident light unit vector is represented by $\vec{r}_n$, the outgoing light unit vector is represented by $\vec{v}_r$, $M_n$, $M_{n+1}$ represent two closely adjacent points on the convex spherical surface 21, and $\vec{N}_t$ is a unit normal vector of a line connecting the two points $M_n$, $M_{n+1}$, then, the following formula can be obtained from the optical path vector relation:

$$\overrightarrow{M_n M_{n+1}} \cdot \vec{N}_t = 0$$

$$\overrightarrow{M_n M_{n+1}} = (x' - x, y' - y) = (\Delta x, \Delta y)$$

$$\vec{N}_t = \frac{(n_1 \vec{v_n} - n_2 \vec{r_n})}{\sqrt{n_1^2 + n_2^2 - 2n_1 n_2 (\vec{v_t} \cdot \vec{r_t})}}$$

$$\vec{r_n} = \left( \frac{x}{\sqrt{x^2 + y^2}}, \frac{y}{\sqrt{x^2 + y^2}} \right)$$

$$\vec{v_n} = (0, 1)$$

Then, the following formula (1) can be obtained from above:

$$\Delta y = \frac{n_2 x}{\sqrt{x^2 + y^2} - n_2 y} \Delta x \quad \text{formula (1)}$$

According to the laws of light, the hypothetical light source point of the actual model of the present application is not at the O point, and then offsetting is required. According to the above formula and the actual "hypothetical light source point", the relationship between Δx and Δy of the DC curve can be obtained, and the coordinate points are calculated by the differential method. The convex spherical surface 21 can be obtained by obtained by fitting the DC curve and rotating the DC curve.

The calculation process of the DC curve is as follows: it can be known from the formula (1) that it is difficult to calculate the original function by integral, and in order to omit the complicated process for calculating the original function, approximate coordinate points can be obtained by the differential method.

Figure 6:
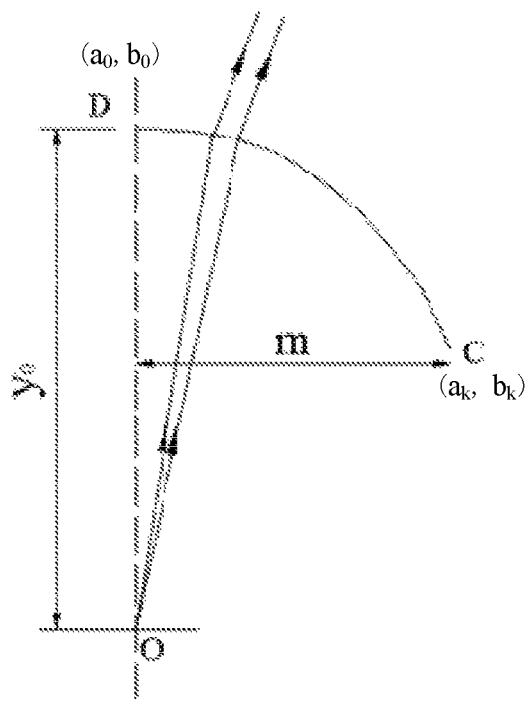
FIG. 6 is a schematic diagram showing a principle of calculating calculus coordinate points of the convex spherical surface according to an embodiment of the present disclosure.

As shown in FIG. 6, a coordinate system is established by taking the O point as the origin. The coordinates of the O point are (0, 0), the starting coordinates of the curve constituting the convex spherical surface 21 are $x_0 = a_0$, $y_0 = b_0$; the coordinates of the end points are $x_k = a_k$, $y_k = b_k$; $b_k$ is an unknown quantity, ak is determined according to the size of the light convergence portion 4, $m = a_k - a_0$, and the DC curve is divided into k segments, and the coordinates of each point on the DC curve are obtained as follows:

| $\Delta x = (ak - a0)/k$ | $\Delta y = \frac{n_2 x}{\sqrt{x^2 + y^2} - n_2 y} \Delta x$ |
|---|---|
| $x_0 = a_0$ | $y_0 = b_0$ |
| $x_1 = a_0 + \Delta x$ | $y_1 = y_0 + \Delta y_0$ |
| $x_2 = a_0 + 2\Delta x$ | $y_2 = y_1 + \Delta y_1$ |
| ... | ... |
| $x_{k-1} = a_0 + (k-1) \Delta x$ | $y_{k-1} = y_{k-2} + \Delta y_{k-2}$ |
| $x_k = a_k$ | $y_k = y_{k-1} + \Delta y_{k-1} = b_k$ |

The DC curve may be subdivided into k+1 points. The larger the k is, the higher the calculation accuracy is. The approximate coordinate points are calculated by the differential method, and the coordinate points are finally fitted to obtain the DC curve.

Figure 7:
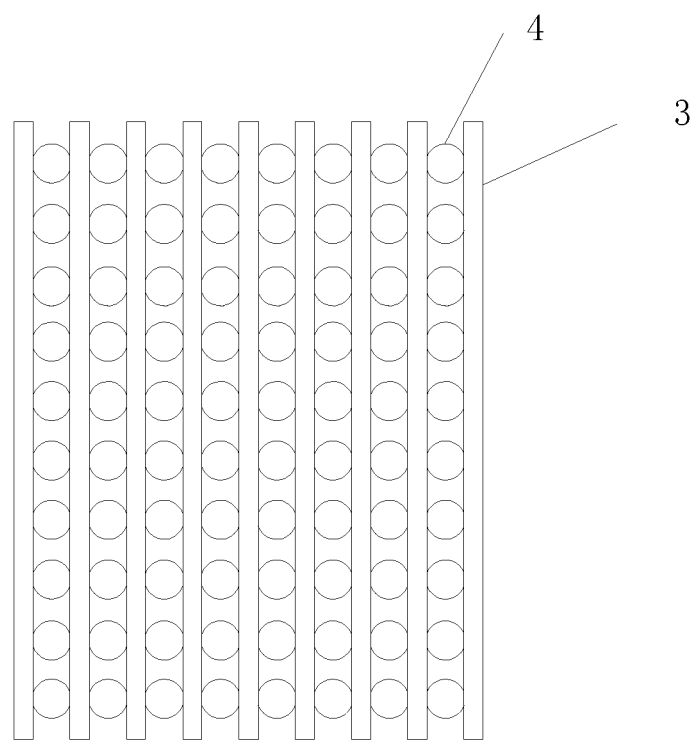
FIG. 7 is a first schematic diagram of a light convergence structure according to an embodiment of the present disclosure.
Figure 8:
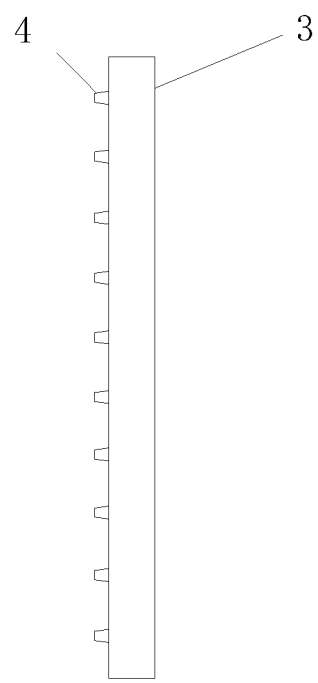
FIG. 8 is a second schematic diagram of a light convergence structure according to an embodiment of the present disclosure.
Figure 9:
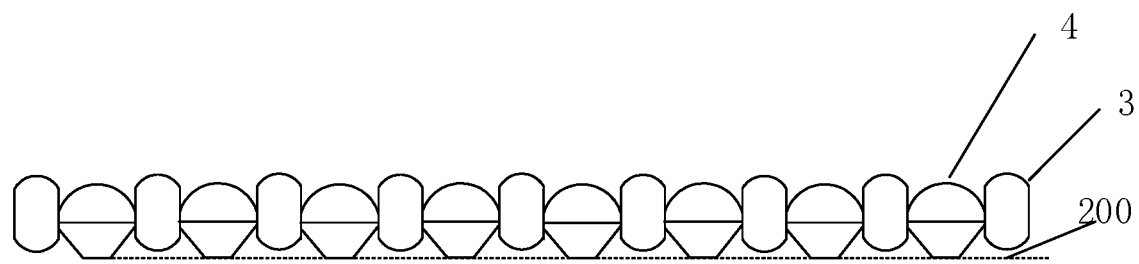
FIG. 9 is a third schematic diagram of a light convergence structure according to an embodiment of the present disclosure.

In this embodiment, as shown in FIGS. 7-9, the body further includes a plurality of connectors 3. One row or column of light convergence portions 4 is located between two adjacent connectors 3. There is a gap between the light guide plate and one end of the connector 3 adjacent the light guide plate.

The presence of the connectors 3 facilitates connection of the light convergence structure and the light guide plate. Further, the presence of the gap between the light guide plate and one end of the connector 3 adjacent the light guide plate facilitates contact between the light convergence portions 4 and the light guide plate. The clearance-free contact between the frustum structure 1 of the light convergence portion 4 and the light guide plate can effectively ensure that light emitted from the light guide plate can directly enter the light convergence portion 4, thereby facilitating control of angles of the light and avoiding light loss.

In one embodiment, a distance from the light guide plate to an end of the connector 3 distal from the light guide plate, is greater than a distance from the light guide plate to the first end of the light convergence portion 4, thereby protecting the light convergence portions 4.

In one embodiment, the quantity and distribution of the light convergence portions 4 may be set according to actual needs. By adjusting arrangement density of the light convergence portions, the picture uniformity can be changed.

In one embodiment, an absolute value of a difference between a refractive index of the light convergence portion 4 and a refractive index of the connector 3 is less than a second preset value. In some embodiments, the absolute value of the difference between the refractive index of the light convergence portion 4 and the refractive index of the connector 3 should be as small as possible. In other words, the second preset value should be as small as possible, thereby reducing loss of light efficiency. Specific value of the second preset value may be set according to actual needs.

Figure 11:
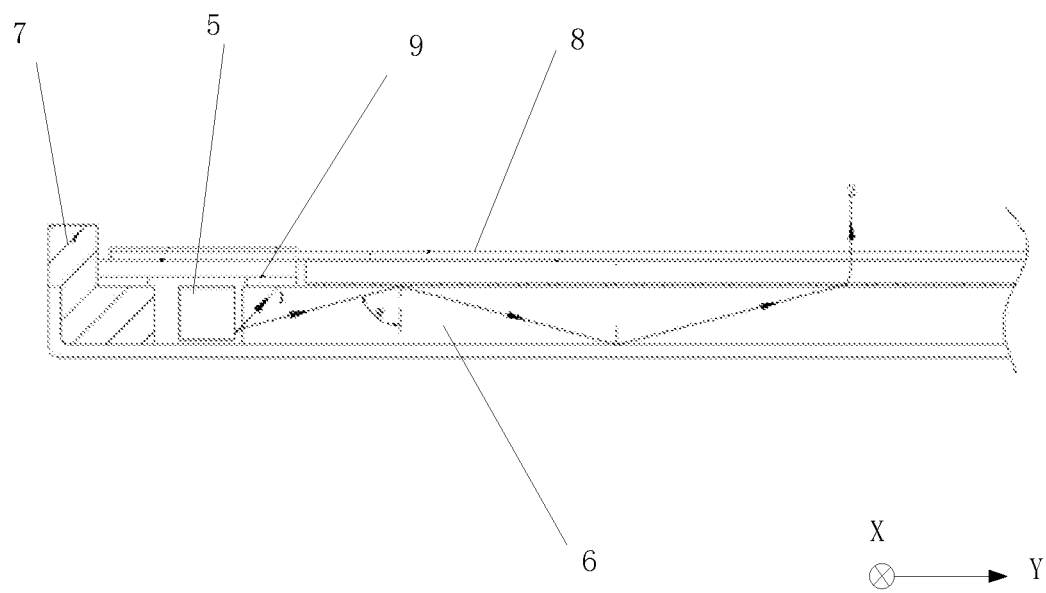
FIG. 11 is a schematic diagram of a backlight module according to an embodiment of the present disclosure.

In the embodiment shown in FIG. 7, the connector 3 is a strip structure. Among light entering the light convergence structure, light travelling in the Y direction (as shown in FIGS. 10-11) is more divergent than the light travelling in the X direction (as shown in FIGS. 10-11). In order to effectively ensure convergent effects of the light convergence structure, when the light convergence structure is disposed on the light guide plate, a length direction of the connector 3 is parallel to a propagation direction of light propagating in the light guide plate (when a light source is disposed at a lateral side of the light guide plate). In other words, the length direction of the connector 3 is parallel to the Y direction (as shown in FIGS. 10-11).

The light that is propagated in the light guide plate in a total reflection manner, cannot enter the connector 3 due to the gap between the connector 3 and the light guide plate. At the position where the connector 3 is in contact with the light convergence portion 4, a small amount of light may enter the connector 3. Optionally, in one embodiment, the connector 3 and the light convergence portion 4 may be made of the same material, i.e., the second preset value is zero. Then, when light travels from the connector 3 into the corresponding light convergence portion 4, no refraction occurs. The light convergence portion 4 has better convergence effect on light that travels directly from the light guide plate into the light convergence portion 4, as compared with light that travels from the connector 3 to the corresponding light convergence portion 4. Thus, in order to reduce light that enters the connector 3, a width of the connector should be as small as possible to reduce the light loss.

The width of the connector 3 may be set to a minimum value, which can ensure a stable connection of the light convergence portions 4, thereby minimizing an amount of light entering the connector 3. At this point, the amount of light entering the connector 3 is very small and can be neglected.

In this embodiment, a first light shading portion 8 is disposed at a side surface of the body, thereby preventing light leakage.

The first light shading portion 8 may be attached to the side surface around a periphery of the body via square seal.

As shown in FIG. 11, one embodiment of the present disclosure further provides a backlight module that includes a light guide plate 6, a light source 5, and a rubber frame 7. The rubber frame 7 disposed around the light guide plate 6 and the light source 5. The light guide plate 6 has a light-entering surface and a light emitting surface adjacent the light-entering surface. The light source 5 is disposed at one side of the light guide plate 6 and adjacent the light-entering surface. The backlight module further includes the above light convergence structure disposed on the light emitting surface of the light guide plate 6.

Further, the light emitting surface of the light guide plate 6 may be divided into a first area and a second area along a propagation direction of light travelling in the light guide plate. A second light shading portion 9 is disposed at the first area. Among light rays emitted from the light source 5, light rays which are irradiated on the light guide plate 6 at an incident angle less than the first angle, enter the first area. Among light rays emitted from the light source 5, light rays which are irradiated on the light guide plate 6 at an incident angle greater than the first angle, enter the second area. The first angle is a total reflection threshold angle.

The presence of the second light shading portion 9 is used to prevent light leakage.

Further, a reflective layer is disposed on the light guide plate 6 except for the light emitting surface and the light-entering surface. The presence of the reflective layer is used to improve brightness of the backlight module.

In one embodiment, the light source 5 includes, but not limited thereto, LEDs.

In one embodiment, in order to ensure light effect as well as to facilitate controlling of light paths, the light propagates in the light guide plate 6 in a total reflection manner, and the light guide plate 6 does not contain any microstructure. Meanwhile, except for the light-entering surface and the light emitting surface, the other four sides of the light guide plate 6 is coated with the reflective layer. As shown in FIG. 11, light rays which are emitted from the light source 5, enter the light guide plate 6 at an angle of α. When the angle of α is greater than the total reflection threshold angle θ m (i.e., light ray indicted by reference number 2), the light ray is totally reflected in the light guide plate 6 and finally enters the light convergence structure. A small amount of light rays is irradiated on the light guide plate 6 at the angle of α less than the total reflection threshold angle θ m (i.e., light ray indicted by reference number 1), and then is directly emitted from the first area in the light emitting surface of the light guide plate 6. In order to prevent light leakage from the light source, a light absorbing black strip (i.e., the second light shading portion 9) is attached to the first area.

The presence of the light convergence structure can realize optical direction regulation in at least two dimensions, thereby satisfying design requirements for structural optimization and low cost.

Figure 12:
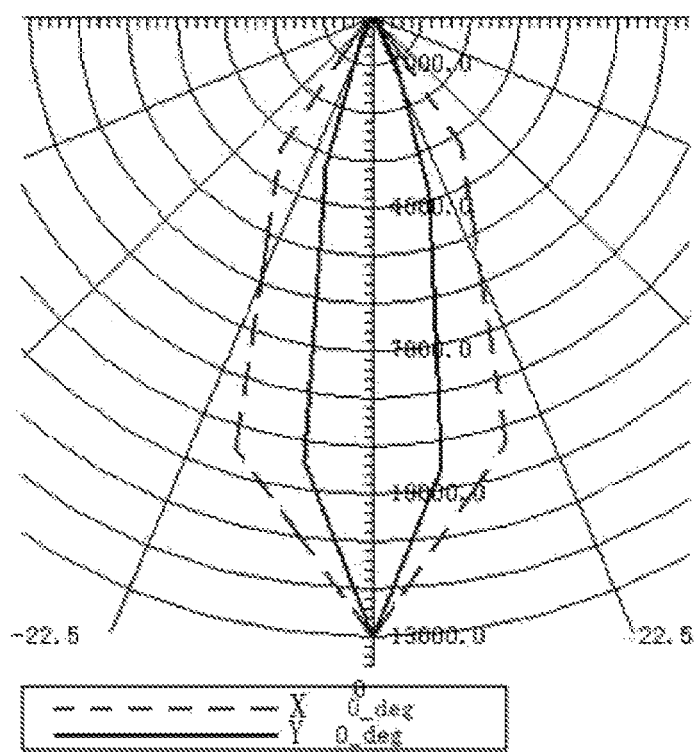
FIG. 12 is a schematic diagram showing simulated brightness of the backlight module according to an embodiment of the present disclosure.

As shown in FIG. 12, an angle of a half-brightness angle of the light travelling in the first dimension direction (i.e., Y direction shown with a solid line) may be ±15° or ±20°; an angle of a half-brightness angle of the light travelling in the second dimension direction (i.e., X direction shown with a dotted line) may be ±15° or ±20°. There is a cut-off angle about 40° in the first dimension direction. There is a cut-off angle about 50° in the second dimension direction.

The brightness and uniformity of the backlight module can be adjusted by adjusting the arrangement of the light convergence portions. When the density of the light convergence portions is equal to the density of dots in the light guide plate, brightness of the backlight module of one embodiment can be increased by 15% as compared with backlight modules in the related art and thus has good collimation effect.

In the related art, a bottom surface of a light guide plate of a backlight module is provided with dots, to break the total reflection of the light in the light guide plate, and then a reflective sheet is required to reflect the light emitted from the bottom surface of the light guide plate. While in one embodiment of the present disclosure, the light guide plate 6 of the backlight module does not contain any microstructure, and the light travels in the light guide plate 6 in a total reflection manner, so that the reflection sheet is not required. Thus, the backlight module in one embodiment of the present disclosure can reduce utilization of the reflection sheet as compared with the backlight module in the related art. In addition, in one embodiment, the thickness of the body is relatively thin, generally 0.06 mm (but not limited thereto), thereby enabling the backlight module to be an ultra-thin structure with a thickness T less than 0.6 mm.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A light convergence structure comprising: a plurality of light convergence portions arranged in an array, wherein:
   each of the plurality of light convergence portions includes a frustum structure and a plano-convex structure;
   the frustum structure includes a first end surface and a second end surface, the first end surface and the second end surface are two opposite surfaces of the frustum structure, and an area of the first end surface is less than an area of the second end surface;
   the plano-convex structure is on the second end surface of the frustum structure, the plano-convex structure includes a flat surface and a convex spherical surface, the flat surface and the convex spherical surface are two opposite surfaces of the plano-convex structure, the flat surface is in contact with the second end surface, and an area of the flat surface is equal to the area of the second end surface;
   the first end surfaces of the plurality of light convergence portions are coplanar and together define a light incident surface of the light convergence structure,
   wherein the light convergence structure further includes a plurality of connectors, the light convergence portions in one row or column are located between two adjacent connectors, and there is a gap between the light incident surface and one end of the connectors adjacent the light incident surface.

2. The light convergence structure of claim 1, wherein the flat surface coincides with the second end face.

3. The light convergence structure of claim 2, wherein an angle is defined between an outer periphery surface of each frustum structure and the light incident surface, and the angle is greater than such a preset angle so that light entering into the frustum structure is totally reflected on an inner side wall of the frustum structure.

4. The light convergence structure of claim 1, wherein each frustum structure includes a first sub-frustum structure and a second sub-frustum structure from the first end surface to the second end surface;
   a first angle is defined between the light incident surface and an outer periphery surface of the first sub-frustum structure adjacent the light incident surface; a second angle is defined between the light incident surface and an outer periphery surface of the second sub-frustum structure distal to the light incident surface; and the first angle is less than the second angle.

5. The light convergence structure of claim 1, wherein a curvature of the convex spherical surface satisfies a preset condition such that light totally reflected by an inner side wall of the frustum structure is refracted to form a collimated light perpendicular to the light incident surface.

6. The light convergence structure of claim 1, wherein a distance from the incident surface to an end of the connectors distal from the light incident surface, is greater than a distance from the light incident surface to the first end of the light convergence portions.

7. The light convergence structure of claim 6, wherein an absolute value of a difference between a refractive index of the light convergence portion and a refractive index of the connector is less than or equal to a preset value.

8. The light convergence structure of claim 6, wherein an absolute value of a difference between a refractive index of the light convergence portion and a refractive index of the connector is zero.

9. The light convergence structure of claim 1, wherein a first light shading portion is at a lateral side surface of the light convergence structure.

10. The light convergence structure of claim 9, wherein a thickness of the light convergence structure in a direction perpendicular to the light incident surface is 0.06 mm.

11. A backlight module comprising:
    a light guide plate having a light-entering surface and a light emitting surface; and
    a light convergence structure on the light emitting surface of the light guide plate;
    wherein the light convergence structure includes a plurality of light convergence portions, and each of the plurality of light convergence portions includes a frustum structure and a plano-convex structure;
    the frustum structure includes a first end surface and a second end surface, the first end surface and the second end surface are two opposite surfaces of the frustum structure, and an area of the first end surface is less than an area of the second end surface;
    the plano-convex structure is on the second end surface of the frustum structure, the plano-convex structure includes a flat surface and a convex spherical surface, the flat surface and the convex spherical surface are two opposite surfaces of the plano-convex structure, the flat surface is in contact with the second end surface, and an area of the flat surface is equal to the area of the second end surface;
    the first end surfaces of the plurality of light convergence portions are coplanar and together define a light incident surface of the light convergence structure, and the light incident surface of the light convergence structure is in contact with the light emitting surface of the light guide plate,
    wherein the light convergence structure further includes a plurality of connectors, the light convergence portions in one row or column are located between two adjacent connectors, and there is a gap between the light incident surface and one end of the connectors adjacent the light incident surface.

12. The backlight module of claim 11, wherein the backlight module further includes a light source at the light-entering surface of the light guide plate, the light emitting surface of the light guide plate includes a first area and a second area along a propagation direction of light travelling in the light guide plate;
    a second light shading portion is at the first area;
    among light rays emitted from the light source, light rays which are irradiated on the light guide plate at an incident angle less than a first angle, enter the first area; among the light rays emitted from the light source, light rays which are irradiated on the light guide plate at an incident angle greater than the first angle, enter the second area; and the first angle is a total reflection threshold angle.

13. The backlight module of claim 11, wherein a reflective layer is on the light guide plate except for the light emitting surface and the light-entering surface.

14. The backlight module of claim 11, wherein an absolute value of a difference between a refractive index of the light convergence portion and a refractive index of the light guide plate is less than or equal to a preset value, such that when light is propagated in the light guide plate in a total reflection manner, and when the light is propagated to a position corresponding to the first end surface of the light convergence portion, the light is enabled to directly enter into the light convergence portion at the position.

15. The backlight module of claim 14, wherein the preset value is zero.

16. The backlight module of claim 11, wherein the flat surface coincides with the second end face.

17. The backlight module of claim 16, wherein an angle is defined between an outer periphery surface of each frustum structure and the light incident surface, and the angle is greater than such a preset angle so that light entering into the frustum structure is totally reflected on an inner side wall of the frustum structure;
- each frustum structure includes a first sub-frustum structure and a second sub-frustum structure from the first end surface to the second end surface;
- a first angle is defined between the light incident surface and an outer periphery surface of the first sub-frustum structure adjacent the light incident surface;
- a second angle is defined between the light incident surface and an outer periphery surface of the second sub-frustum structure distal to the light incident surface; and the first angle is less than the second angle.

18. The backlight module of claim 11, wherein a curvature of the convex spherical surface satisfies a preset condition such that light totally reflected by an inner side wall of the frustum structure is refracted to form a collimated light perpendicular to the light incident surface.

19. The backlight module of claim 11, wherein
- the plurality of light convergence portions are arranged in an array on the light emitting surface of the light guide plate; and
- a distance from the incident surface to an end of the connectors distal from the light incident surface, is greater than a distance from the light incident surface to the first end of the light convergence portions.

\* \* \* \* \*